United States Patent [19]

Muscat et al.

[11] Patent Number: 5,052,714
[45] Date of Patent: Oct. 1, 1991

[54] HOOD ORNAMENT RETRACTION DEVICE

[76] Inventors: Anthony J. Muscat, 2072 20th La., #4,, Brooklyn, N.Y. 11214; Robert A. Fernald, 203 E. Springmeadow Dr., Hollbrook, N.Y. 11741

[21] Appl. No.: 418,867
[22] Filed: Oct. 10, 1989
[51] Int. Cl.⁵ .............................................. B60R 13/00
[52] U.S. Cl. .................................... 280/762; 40/591; 428/31
[58] Field of Search .................. 280/762, 727; 428/31; 40/591, 601, 602

[56] References Cited

U.S. PATENT DOCUMENTS

| | | | |
|---|---|---|---|
| 1,611,745 | 12/1926 | Harris | 428/31 |
| 2,312,005 | 2/1943 | Smith | 240/7.1 |
| 2,877,046 | 3/1959 | Funk | 296/1 |
| 3,531,634 | 9/1970 | Plouch | 240/7.1 |
| 3,813,113 | 5/1974 | Burnham | 280/762 |
| 3,831,689 | 8/1974 | Smith | 180/1 R |
| 3,905,435 | 9/1975 | Coronado | 180/1 AP |
| 3,968,977 | 7/1976 | Wilfert | 280/727 |
| 4,788,550 | 11/1988 | Chadima, Jr. | 343/712 |
| 4,894,755 | 1/1990 | Chandler | 362/83 |
| 4,936,670 | 6/1990 | Yoo | 350/604 |

Primary Examiner—David M. Mitchell
Attorney, Agent, or Firm—Lane, Aitken & McCann

[57] ABSTRACT

A device for retracting a motor vehicle hood ornament comprises a carrier for conveying the ornament between a first position in which the ornament is retracted below the hood of a motor vehicle and a second positon in which the ornament is displayed atop the hood, a drive mechanism for driving the carrier, and a control mechanism for causing the drive mechanism to drive the carrier to propel the ornament to the first position upon receipt of a first signal and to drive the carrier to propel the ornament to the second position upon receipt of a second signal.

13 Claims, 7 Drawing Sheets

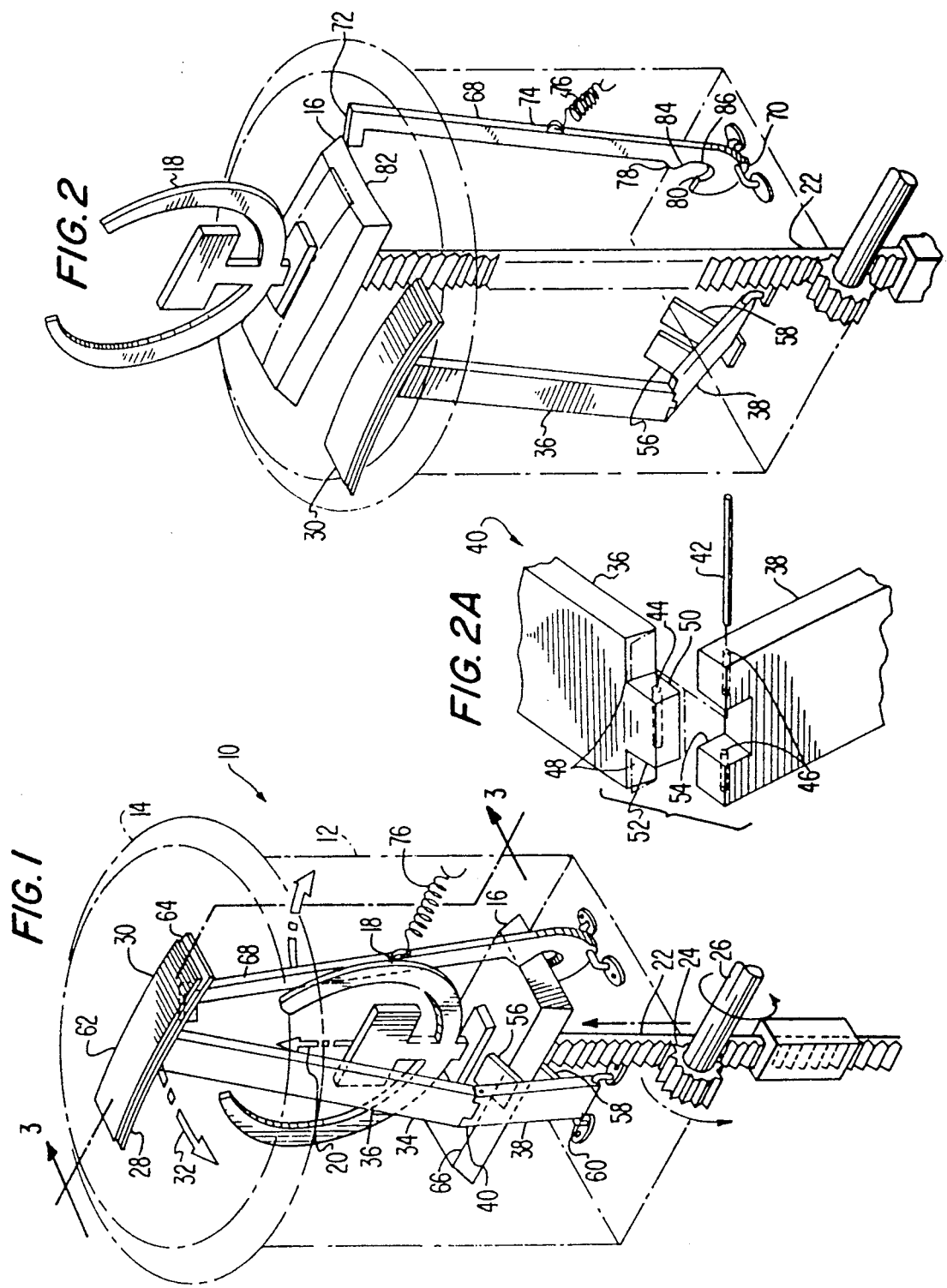

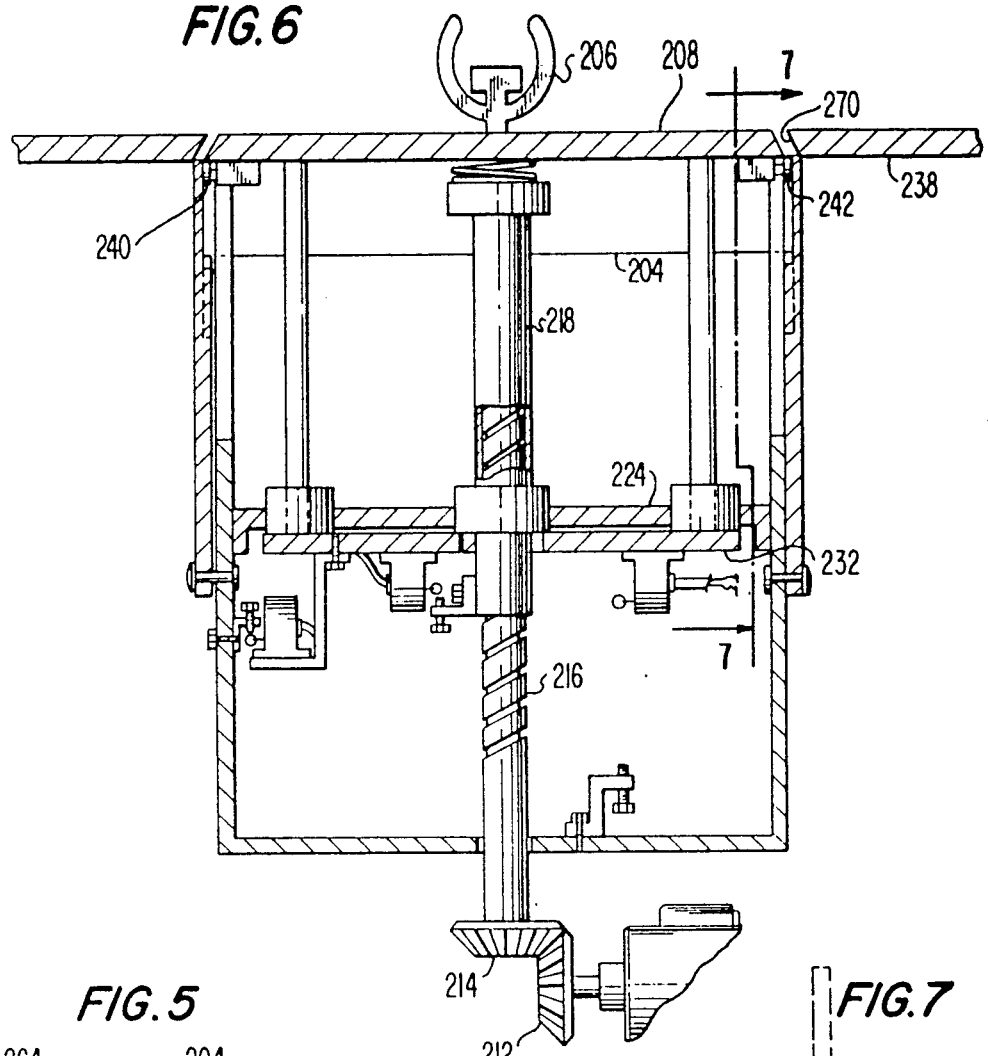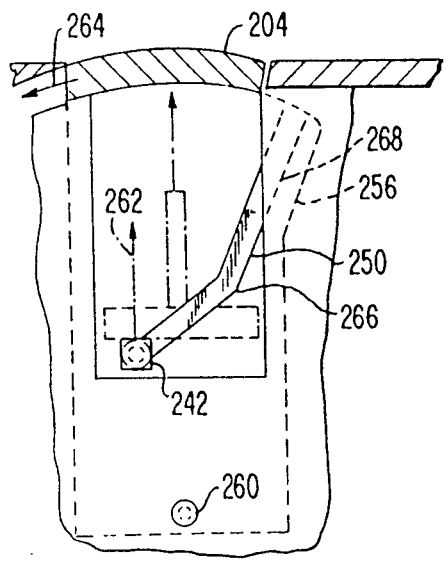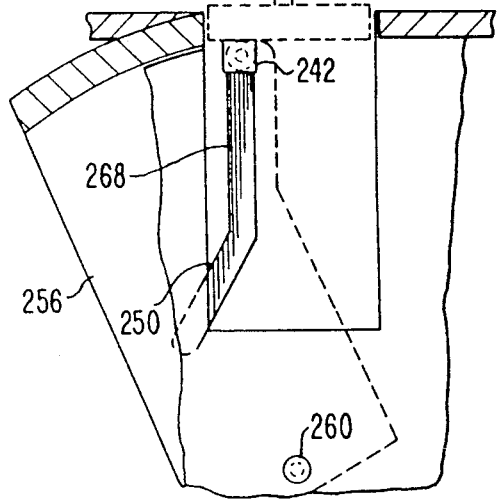

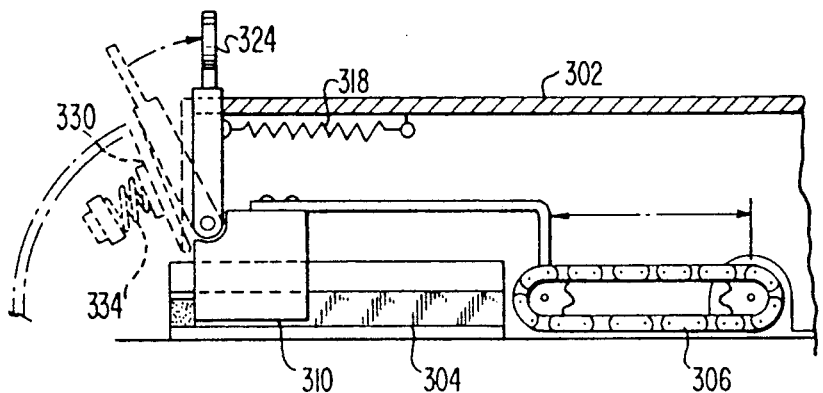
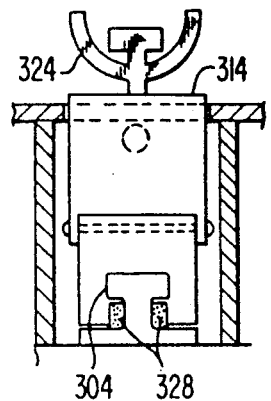
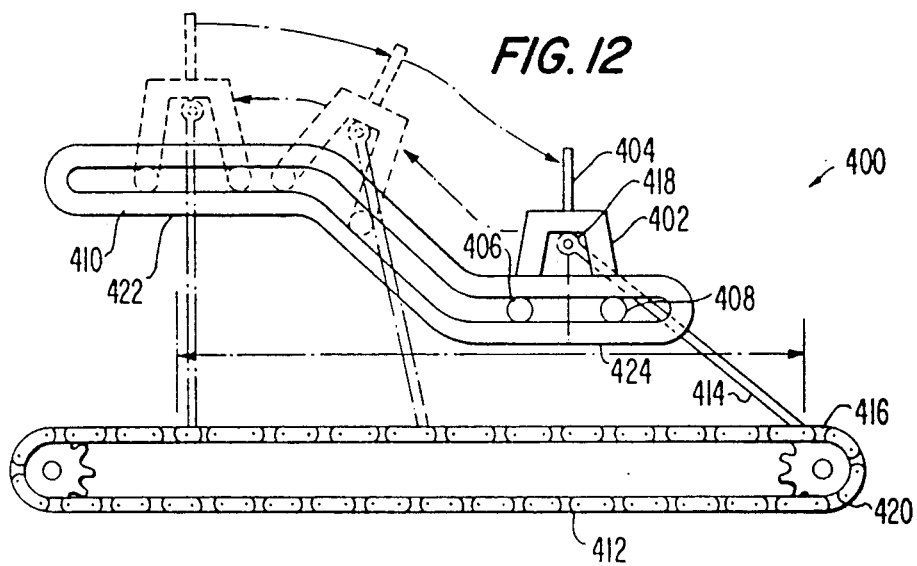
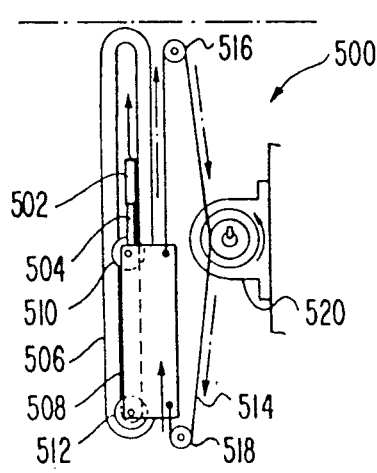
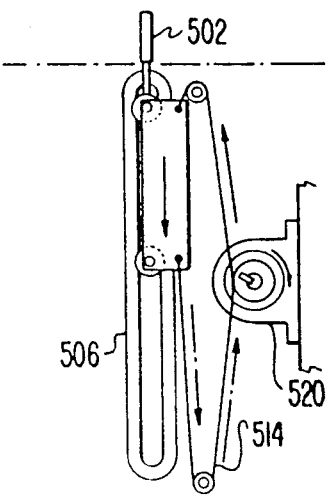

HOOD ORNAMENT RETRACTION DEVICE

BACKGROUND OF THE INVENTION

1. Field of the Invention

This invention relates to a device for protecting hood ornaments from theft and damage.

2. Description of the Related Art

For many years, decorative emblems, statuettes, figurines and the like have been displayed at various locations on motor vehicles, often on the hood over the engine compartment. Most typically, such hood ornaments have been rigidly fastened to the hood, such that the ornaments were not allowed any freedom of movement with relation to the hood. Such fixed attachments were unsatisfactory, since a sufficient force applied against the ornament would cause damage to the ornament and possibly the vehicle hood.

In more recent years, the automobile industry has attempted to respond to this problem. Many automobiles today are equipped with spring-loaded hood ornaments, whereby the ornament is biased into a substantially upright position, but is allowed a freedom of movement in response to a dislocating force. Once the force is removed, such ornaments typically return to their substantially upright positions, without damage.

Spring-loaded hood ornaments have unfortunately solved only part of the problem. The spring-loaded feature avoids damage otherwise caused by simple blows to the ornament, but do not address a more acute problem caused by thieves and determined vandals. Thieves intent on removing hood ornaments have little trouble overcoming the flexible attachment of the ornament to the hood, and vandals intent on damaging or removing an exposed ornament likewise find a way to do so. The problem of intentional damage and removal of hood ornaments has become exacerbated over recent years as incidents of thievery and vandalism have markedly increased. The cost of replacing hood ornaments can range up to $800 and above for certain luxury models. The industry has failed to provide a satisfactory solution.

It is accordingly an object of the present invention to provide a means for automatically displaying a hood ornament when the key switch or a locking mechanism of a motor vehicle is in an accessory or locked position, and automatically retracting the ornament when the key switch or locking mechanism is in an off or unlocked position.

It is a further object of the present invention to provide a means for automatically displaying and retracting a hood ornament that requires a minimal amount of space underneath the vehicle's hood.

It a further object of the present invention to provide a means for automatically displaying and retracting a hood ornament that provides a retractable cover over an opening through which the ornament may pass.

It is a further object of the present invention to provide a means for automatically displaying and retracting a hood ornament that includes a safety means, whereby the ornament is not moved into a display position when the ornament's movement into the display position is obstructed.

Other objects of the present invention will be apparent from the following detailed description.

SUMMARY OF THE INVENTION

The aforementioned objects are fully met by the practice of the present invention, which in its broadest sense, is a device for retracting a motor vehicle hood ornament that includes a carrier, a drive means, and a control means. The carrier conveys the ornament between a first position in which the ornament is retracted below the hood of a motor vehicle and a second position in which the ornament is displayed atop the hood. The drive means drives the carrier and is controlled by the control means. The control means causes the drive means to drive the carrier to propel the ornament to the first position upon receipt of a first signal and to drive the carrier to propel the ornament to the second position upon receipt of a second signal.

BRIEF DESCRIPTION OF THE DRAWINGS

FIG. 1 illustrates in perspective a preferred embodiment of the invention, showing a hood ornament in a retracted position;

FIG. 2 illustrates in perspective the embodiment of FIG. 1, with the ornament extended;

FIG. 2A details a portion of FIG. 2;

FIG. 5 is a cross-sectional view taken along line 5—5 of FIG. 4;

FIG. 6 is a partially cut-away front view of the embodiment of FIG. 4, with the ornament displayed;

FIG. 7 is a cross-sectional view taken along line 7—7 of FIG. 6;

FIGS. 10 and are respective side and front views of the embodiment of FIG. 9, with the ornament extended;

FIG. 12 is a side view of a fourth embodiment of the invention;

FIGS. 13 and 14 are side views of a fifth embodiment of the invention, illustrating, respectively, an ornament in retracted and exposed positions;

DETAILED DESCRIPTION OF THE PRESENT INVENTION

Figure 3:
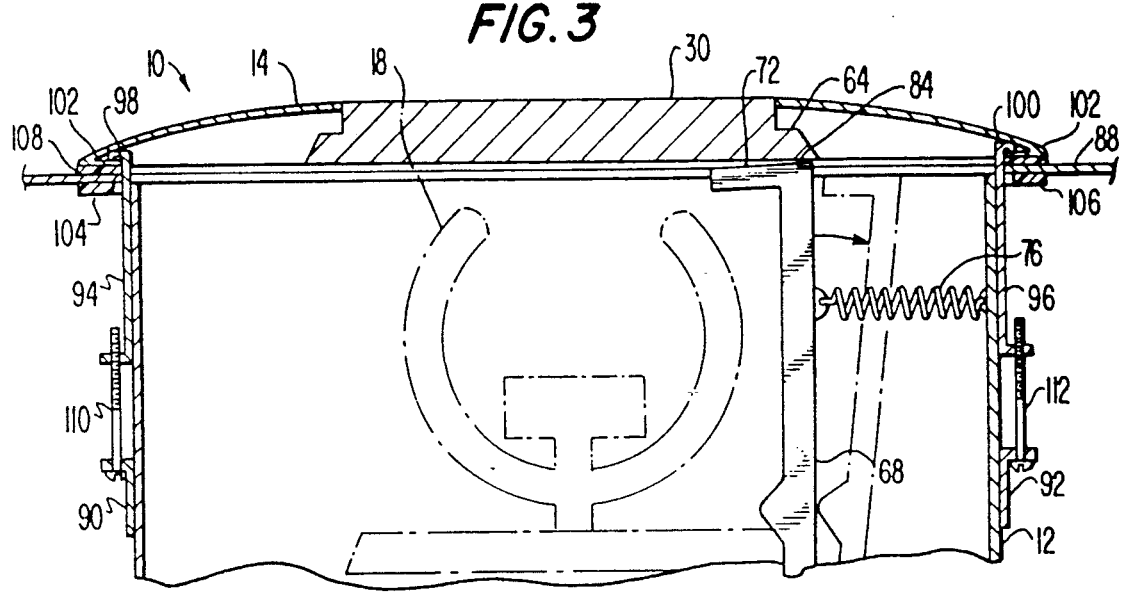
FIG. 3 is a cross-sectional view, taken along line 3—3 of FIG. 1.

A preferred embodiment of the invention is illustrated in FIGS. 1 through 3. A hood ornament retraction device 10 includes a housing 12 with a dome shaped covering plate 14. Base 16 carries ornament 18, which, as illustrated, is in the nature of an emblem, along a substantially vertical path illustrated by arrow 20, between the retracted position shown in FIG. 1 and the exposed position shown in FIG. 2. The path is indicated by arrow 20 of FIG. 1.

Emblem base 16 is propelled along a vertical path by any suitable means, and preferably by a rack 22 and pinion 24, as illustrated in FIG. 1. Pinion 24 may be rotated in a counterclockwise fashion, as illustrated by arrows in FIG. 1, by means of a motor (not shown) that is connected to shaft 26. Such counterclockwise motion causes rack 22 to move upward, thus propelling emblem 18 toward and through plate 14. A reversal of the polarity of the motor causes the motor to rotate pinion 24 in a clockwise fashion, and this in turn causes rack 22 to lower and emblem 18 to move toward a fully retracted position.

Emblem 18 passes through rectangular opening 28 in plate 14 on its way to a fully exposed position. Door 30 normally closes opening 28, thus protecting the internal workings of device 10 from the weather, providing an aesthetically pleasing appearance, and discouraging thieves and vandals. Door 30 moves away from the opening, in the direction of arrow 32, as the emblem approaches it.

Door 30 is carried in the direction of arrow 32 on door arm 34. Door arm 34 consists of uppermost portion 36 and lowermost portion 38. The two portions are not disposed in a straight line, but are instead slightly angled with respect to one another.

The degree of the angle formed by portions 36 and 38 varies within parameters set by hinge 40. As best illustrated in FIG. 2A, hinge 40 consists of pin 42, which is received in cylindrical openings 44, 46. The angle between uppermost portion 36 and lowermost portion 38 are defined by slightly angled faces 48, 50 of uppermost portion 36. End faces 48 are angled 8 degrees inwardly from bottom to top, and the face 50 of rectangular projection 52 is angled 8 degrees inwardly as that face approaches the end of projection 52. Projection 52 generally fits snugly within rectangular notch 54 of bottommost portion 38, but hinged movement is allowed to the extent that the 8 degree angles of faces 48 and 50 provide clearance.

The particular orientation of door arm 34 is determined by the engagement of either opening trigger 56 or closing trigger 58 with emblem base 16. When emblem 18 is retracted, rack and pinion 22, 24 is powered to move emblem base 16 downwardly against closing trigger 58. This abutment of base 16 and trigger 58 causes arm 34 to pivot on bracketed pin 60 toward the forward orientation illustrated in FIG. 1. In this position, raised surface 62 of door 30 is retained within opening 28, while ledge 64 of door 30 sealingly engages a lower surface of plate 14 which surrounds opening 28.

The opening of door 30 is effected when rack and pinion 22, 24 power the movement of emblem base 16 upwardly against opening trigger 56. In particular, angled face 66 of emblem base 16 moves against the underside of opening trigger 56, which is at a 140-degree angle with bottommost portion 38 of door arm 34. As base 16 moves against trigger 56, arm 34 pivots outwardly on pin 60. The relative movement between uppermost portion 36 and lowermost portion 38 provided by hinge 40 allows door 30 to move downwardly a small amount so as to provide clearance between the underside of plate 14 and the upper surface of door 30 as the outward pivoting occurs. Door 30 continues to move in the direction of arrow 32 until emblem base 16 passes by the distal end of trigger 56, at which point the door is sufficiently displaced so as to allow emblem 18 and base 16 to achieve the position illustrated in FIG. 2. When the emblem 18 is next retracted, emblem base 16 passes freely by trigger 56, but engages closing trigger 58, whereby arm 34 reassumes a forward orientation and door 30 reassumes a closing relationship with the opening in plate 14.

Locking arm 68 retains door 30 in its closed position, as best illustrated in FIG. 3. The locking arm generally extends from the floor to the ceiling of housing 12, and is allowed to pivot on bracketed pin 70. At its uppermost portion, locking arm 68 comprises an extension 72, the uppermost surface of which forms an 85-degree angle with main portion 74 of the locking arm. Spring 76 connects the locking arm to housing 12 and biases the locking arm into the rearward orientation illustrated in FIG. 2.

Forward and rearward movement of locking arm 68 is effected by the interaction of unlocking trigger 78 and locking trigger 80 with angled side 82 of emblem base 16. When the action of the rack and pinion draws the emblem base downward, side 82 abuts locking trigger 80, causing the locking arm to pivot forward into the orientation illustrated in FIGS. 1 and 3. Because closing trigger 58 of door arm 34 is positioned higher than locking trigger 80, downwardly moving emblem base 82 moves against closing trigger 58 before it moves against locking trigger 80. In this fashion, door 30 is positioned adjacent to hole 28 before locking arm 74 is caused to move into a locking position. Because extension 72 slopes downward in the direction of door 30, it is able to move beneath door 30, and, as it continues to move forwardly beneath door 30, it acts as a wedge, causing door 30 to be elevated into opening 28. When emblem 18 and emblem base 16 achieve the fully retracted position illustrated in FIG. 1, locking arm 68 is positioned such that its uppermost edge 84 abuts the bottom of door 30, thereby exerting its maximum closing force against the door. Locking arm 68 releases door 30 an emblem base 16 is moved by racket and pinion 22, 24 to a displayed position. The locking arm is released when angled side 82 of the emblem base moves against bottom surface 84 of unlocking trigger 78. Because surface 84, which forms a 140-degree angle with substantially vertical surface 86 of the locking arm, is located below opening trigger 56 of door arm 34, the locking arm releases door 30 before door arm 34 moves rearwardly to retract the door. The rearward movement of locking arm 68, caused by the abutment of emblem base 16 with unlocking trigger 78, is facilitated by spring 76. When emblem 18 is next retracted, the emblem base freely passes by unlocking trigger 78 in its downward movement.

FIG. 3 shows the means by which housing 12 is affixed to plate 14, and how device 10 is affixed to vehicle hood 88. L-shaped brackets 90, 92 are fixed to opposing outer walls of housing 12. L-shaped brackets 94, 96 are positioned above brackets 90, 92 and are provided with overhanging projections 98, 100, which engage a lip 102 of plate 14. After installation, lip 104, 106 of housing 12 is positioned below the edge of a hole cut into vehicle hood 88, and lip 102 is positioned above that edge. Annular gasket 108 interposes lip 102 and vehicle hood 88 to provide a seal and prevent scratching of the hood 88. The tightening of bolts 110, 112 secures housing 12 to plate 14 while at the same time securing device 10 to the hood.

Figure 3A:
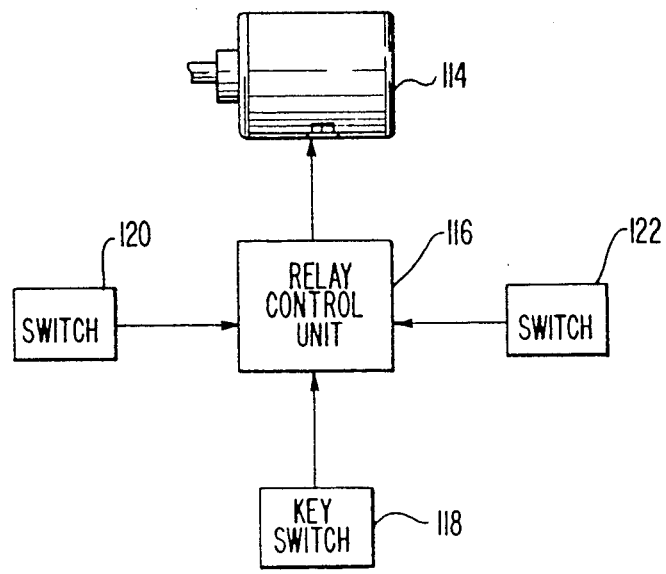
FIG. 3A schematically illustrates circuitry for controlling the drive means of the invention.

The motor that drives shaft 26 to thus rotate pinion 24 is automatically controlled by a relay control unit that is wired to the fuse block on the accessory side of the vehicle's key switch. FIG. 3A schematically illustrates this arrangement. Motor 114 is powered by the vehicle's battery, and relay control unit 116 preferably controls motor 114 by controlling the flow and polarity of current from the battery to the motor. When key switch 118 is moved from an off position to an accessory position, in which power is supplied to most of the vehicle's accessories, the key switch sends a signal to unit 116 which causes unit 116 to energize motor 114. The motor begins to operate drive shaft 26 and pinion 24 in the counterclockwise direction illustrated in FIG. 1, and continues to do so until the emblem is raised from its concealed to its exposed position.

Means are provided for stopping motor 114 when the emblem is fully exposed. A preferred means for shutting off the motor, as illustrated in FIG. 3A, is switch 120. When the emblem reaches the desired exposed position, switch 120 sends a signal to relay control unit 116 which causes unit 116 to deenergize motor 114. In a preferred embodiment, as will be discussed more fully below, switch 120 is a limit switch having a lever that is mechanically actuated by an abutting part of the hood ornament retraction device when the emblem is fully exposed. Instead of using a limit switch to effect the deenergization of the motor, a timed switch is suitably employed to deenergize the motor after it has been energized for a predetermined time interval, selected to allow sufficient time for the emblem to reach the fully exposed position.

The circuitry of FIG. 3A operates similarly to lower the emblem from the exposed to the retracted position. When key switch 118 is moved from the accessory to the off position, it sends a signal to unit 116 which again energizes the motor but with reversed polarity. Since relay control unit 116 has reversed the polarity of the motor, the motor drives shaft 26 and pinion 24 in a clockwise direction, such that rack 22 moves downwardly. When operation of the motor causes the emblem to reach its fully retracted position, switch 122 sends a signal to relay control unit 116, which in turn deenergizes the motor. Switch 122 operates in the same manner as switch 120.

In this fashion, the circuitry optimally and automatically controls the display of the emblem to best overcome the disadvantages of the prior art. The emblem is completely retracted when the key switch is moved from the accessory position, and this advantageously corresponds to a time when the vehicle is likely to be unattended. This minimizes the risk of theft or vandalism when it otherwise would most likely occur. On the other hand, the emblem is fully displayed when the key switch is moved to an accessory position, a time when the vehicle is most likely occupied, and when the vehicle operator most likely would desire the emblem displayed.

In an alternative embodiment, key switch 118 of FIG. 3A is replaced with a door lock or other locking/unlocking mechanism or circuitry associated with the doors, hood, wheel covers, trunk or the like of the vehicle. In this embodiment, the unlocking of such a component causes the locking/unlocking unit to send a signal to relay control unit 116 in the same fashion that key switch 118 sends the signals described in connection with FIG. 3A. The hood ornament is in this fashion exposed when the component of the vehicle is unlocked, a time when the vehicle and its emblem are typically safe from thieves and vandals. When the component is locked, the emblem is retracted, such that the emblem is inaccessible to thieves and vandals at a time when the vehicle is more likely to be unattended.

A second embodiment is illustrated in FIGS. 4 to 7. Hood ornament retraction device 200 comprises housing 202 and door 204. Emblem 206 is positioned on emblem base 208. The emblem is illustrated in a retracted position in FIG. 4 and in an exposed position in FIG. 6.

Figure 4:
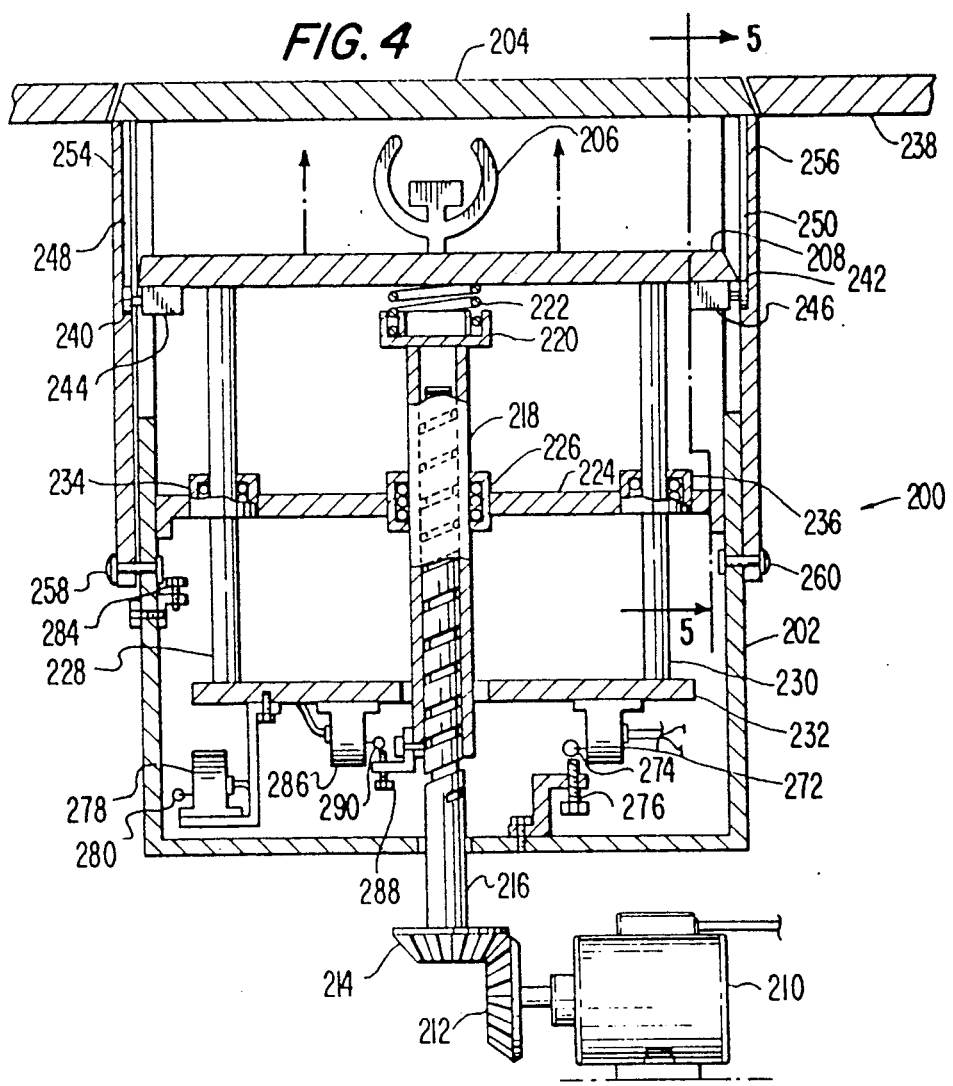
FIG. 4 is a partially cut-away front view of a second embodiment of the invention showing a hood ornament in a retracted position.

The means for driving emblem 206 and emblem base 208 between exposed and retracted positions is best illustrated in FIGS. 4 and 6. Motor 210 drives beveled gear 212 which in turn drives beveled gear 214. Beveled gear 214 is attached to worm screw 216, which is received in internally threaded sleeve 218. The internal threads of sleeve 218 receive the screw portion of worm screw 216. U-shaped cup 220 is fixedly attached to the top of sleeve 218, and spring 222 is fixedly attached at respective ends to cup 220 and emblem base 208.

Motor 210 drives emblem plate 208 and emblem 206 upwardly and downwardly depending on its polarity. In a first state of polarity, beveled gear 212, as viewed from its rear, moves in a counterclockwise direction, and beveled bear 214, when viewed from below, likewise moves counterclockwise. Worm gear 216 drives sleeve 218 upwardly, and this carries spring 222, emblem base 208, and emblem 206 upwardly as well. The sleeve moves freely through fixed plate 224 by means of bearing 226, and guide shafts 228, 230, which are fixedly connected to emblem base 208 and thrust plate 232, similarly move freely through fixed plate 224 by means of bearings 234, 236.

A cam follower and cam groove arrangement ensures the opening of door 204 for the movement of emblem 206 and base 208 through opening 270 in vehicle hood 238. Cam followers 240, 242 are affixed to blocks 244, 246, which are affixed to the peripheral underside of emblem base 208. Cam followers 240, 242 extend outwardly, beyond housing 202, into cam grooves 248, 250. The cam grooves are located in sides 254, 256 of door 204, , which pivots about pivot points 258, 260.

The operation of the cam follower and cam groove arrangement is best understood from a review of FIG. 5. As the movement of worm screw 216 drives emblem base 208 vertically upward, cam followers 240, 242 are likewise driven in a vertically upward direction. The direction of travel of cam follower 242 is illustrated by arrow 262 in FIG. 5. Because cam followers 240, 242 are restricted to a vertical path, and since door 204 is allowed to pivot about pivots 258, 260, door 204 pivots in order to maintain the following relationship between the cam followers and cam grooves. FIG. 5 shows that door 204 must move in the direction of arrow 264 as cam follower 242 moves from its original, lowermost position to elbow 266 of cam groove 250. Once the cam follower has reached the elbow, the door is fully opened, such that no further pivoting of the door is required. At that point, the portion 268 of cam groove 250 that is above elbow 266 is positioned vertically, as best illustrated in FIG. 7. The vertical orientation of portion 268 at this point allows door 204 to remain stationary throughout the remainder of the upward movement of the cam followers.

The result of the upward movement of emblem 206 and base 208 is illustrated in FIG. 6. Cam followers 240, 242 have arrived at the uppermost points within their respective cam grooves, whereby door 204 has pivoted away from opening 270 in hood 238. Thrust plate 232 abuts fixed plate 224 and further upward movement has ceased.

Emblem 206 is retracted from its exposed position, as illustrated in FIG. 6, to the retracted position, as illustrated in FIG. 4, by reversing the polarity of motor 210. This causes gears 212, 214 to move in clockwise directions, which in turn causes sleeve 218 to move downwardly about worm screw 216. As emblem base 208 moves downwardly along with the sleeve, cam followers 240, 242 follow a downward path along respective grooves 248, 250. The result is, as emblem 206 is retracted, door 204 returns to its closed position.

The energizing of motor 210 is suitably effected with limit switches. As illustrated in FIG. 4, limit switch 272 comprises lever 274 which is displaced by set screw 276 when thrust plate 232 has reached its desired lowermost position. At this point, emblem 206 is fully retracted and door 204 is fully closed, and limit switch 272 delivers a stop signal to a relay control unit such as unit 116 in FIG. 3A. Set screw 276 can be adjusted to ensure that the motor cuts off at the exact point of full retraction and full door closure. Similarly, limit switch 278, having lever 280, is disposed on extension 282 from thrust plate 232, and lever 280 is displaced when it moves against set screw 284. Set screw 284 moves against lever 280 when emblem 206 achieves its fully extended position. At this point, limit switch 278 sends a stop signal to the relay control unit.

Problems may arise when there is an obstruction above door 204, such that emblem 106 is prevented from achieving its fully exposed position. Motor 210 or other elements of the device may be damaged, and in some cases, there may be damage to the person or thing constituting the obstruction. The embodiment illustrated in FIG. 4 provides a solution to this problem in the form of spring 222 and limit switch 286. Limit switch 286 is fixedly attached to thrust plate 232, such that it moves in tandem with emblem 206 and emblem base 208. Set screw 288 is fixedly attached to sleeve 218 and likewise moves, in general, in tandem with the emblem and emblem base. However, when the upward movement of emblem 206 is obstructed, the upward movement of emblem base 208, and, consequently, limit switch 286, is retarded. The upward movement of sleeve 218, and, consequently, set screw 288 is, on the other hand, allowed to continue an upward movement until spring 222 is fully compressed. The continued movement of set screw 288 causes it to displace lever 290 of limit switch 286. This causes limit switch 286 to send a stop signal to the relay control unit, whereby further upward movement of emblem 206 is halted and additional damage or injury is avoided.

Figure 8:
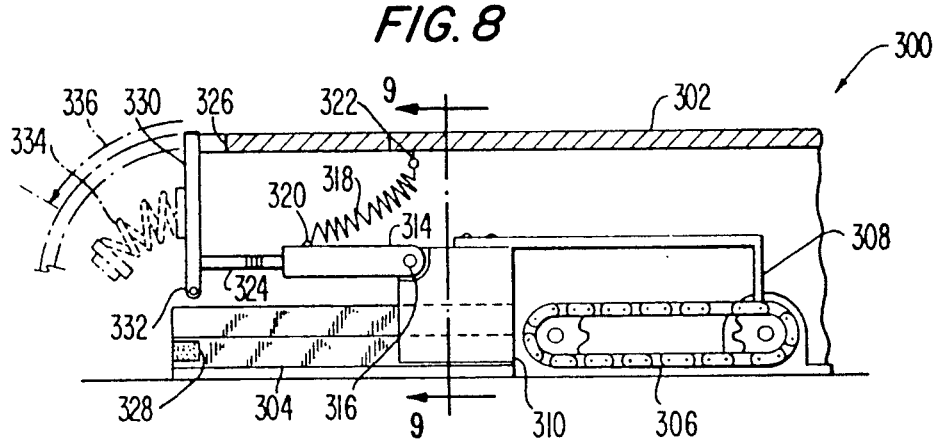
FIG. 8 is a side view of a third embodiment of the invention, showing a hood ornament in a retracted position.
Figure 9:
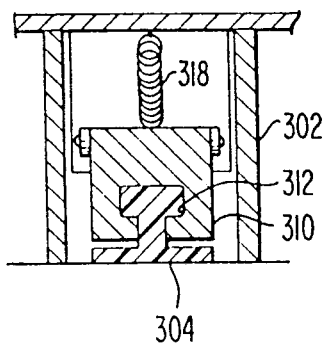
FIG. 9 is a cross-sectional view taken along line 9—9 of FIG. 8.

A third embodiment is illustrated in FIGS. 8 to 11. The third embodiment is particularly preferred in vehicles having crowded engine compartments that are unable to accommodate hood ornament retraction devices of relatively large depth. As illustrated in FIG. 8, a hood ornament retraction device 300 comprises a housing 302 having less depth than the embodiments illustrated in FIGS. 1 and 4. A T-shaped track 304 is affixed to the base of the housing, as is chain and pulley system 306. Rigid post 308 is fixedly attached at one end to a link of the chain and pulley system, and at another end to a slider 310. Slider 310 includes a T-shaped cutout 312 adjacent to its base, and is retained on track 304 as best illustrated in FIG. 9. Emblem base 314 is pivotally attached to slider 310 at pivot point 316. Spring 318 is attached at one end to a point 320 on an upper, forward surface of emblem base 314, and at another end to a point 322 on the ceiling of housing 302, rearward of point 320. Emblem 324 is fixedly attached to the top of emblem base 314.

In operation, a shaft from a motor (not shown) drives the chain such that post 308 moves forward and correspondingly causes slider 310 to move forward along track 304. As the slider moves forward, spring 318 is tensioned and causes emblem 324 and base 314 to rise from its original horizontal position toward an upright position. As post 308 and slider 310 continue to move forward, the emblem and emblem base continue to move toward an upright position, and emblem 324 passes through opening 326 in the top of housing 302. Further forward movement of slider 310 ceases when the slider abuts stoppers 328.

In the embodiment illustrated in FIGS. 8 to 11, additional means are preferably provided to ensure the correct vertical orientation of emblem 324 when in an exposed condition. These means consist of door 330, which pivots about pivot point 332 and is biased in an upright position, as illustrated in FIG. 8, by spring 334. As slider 310 moves forward, emblem 324 moves against door 330 and causes its partial forward displacement, as illustrated by arrow 336 in FIG. 8. The resistance against further forward movement of the door provided by spring 334 causes the emblem and emblem base more surely to pivot upwardly toward the desired vertical orientation. Door 330 regains its original vertical disposition when emblem 324 is fully extended. This operation of door 330 is best illustrated in FIG. 10. The starting and stopping of the motor that drives chain and pulley system 204 is controlled by timed switches or limit switches, as discussed above.

FIG. 12 illustrates a fourth embodiment of the present invention. Hood ornament retraction means 400 includes an inverted U-shaped emblem base 402 which supports emblem 404. Emblem base 402 is provided with rollers 406, 408 which are received in and allowed to move along track 410. Emblem base 402 is driven along track 410 by means of chain and pulley system 412. Post 414 is affixed at one end to a link 416 of system 412, and at another end to a pivot point 418 of emblem base 402. A shaft from a motor (not shown) drives a pulley 420 of system 412. This causes link 416 to move either in a forward or rearward direction, depending on the polarity of the motor. As the link moves, so does rigid post 414, and this movement in turn causes emblem base 402 to move back and forth along track 410. When the emblem base moves forward to uppermost portion 422 of track 410, emblem 404 is exposed, and when the emblem base moves to rearward portion 424 of track 410, emblem 404 is retracted underneath the vehicle's hood.

FIGS. 13 and 14 illustrate a fifth embodiment of a hood ornament retracting device 500, wherein emblem 502 and emblem base 504 are propelled along vertical track 506. Emblem base 504 is vertically affixed to rack 508, which includes rollers 510, 512 that are received in and moved along the track. Chain or cable 514 is affixed to rack 512 and moved in a forward or reverse direction about pulleys 516, 518 by means of drive means 520. In FIG. 13, the drive means drives chain 514 in a clockwise direction, causing the upward movement of emblem 502 toward an exposed position. In FIG. 14, chain 514 is driven counterclockwise, and emblem 502 is moved downwardly toward a retracted position.

Emblems on some vehicles slant toward the rear of the vehicle, and present special problems. When the hood ornament retraction device raises the emblem to an exposed position along a straight line, it is generally necessary to tilt the entire retraction device in order to achieve a desired tilt of the emblem in its exposed position. Yet, when such emblem is also generally displayed at the front of the vehicle's hood, there is typically insufficient clearance with the front of the engine compartment to allow the required tilting of the device.

Figure 15:
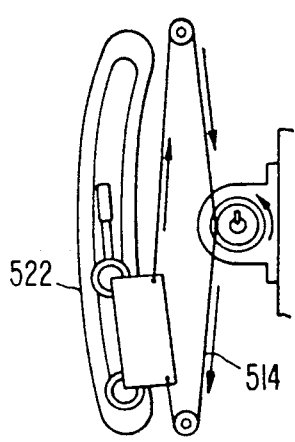
FIGS. 15 and 16 are side views of a modified version of the fifth embodiment of FIGS. 13 and 14.
Figure 16:
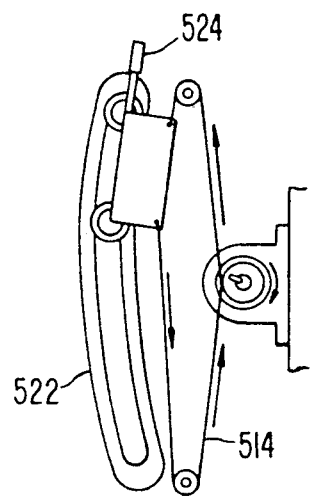

The embodiment illustrated in FIGS. 15 and 16 solves this problem. The hood ornament retraction device operates in the same way as does the device of FIGS. 13 and 14, but track 522 is arcuate rather than straight. Thus, as illustrated in FIG. 16, emblem 524 achieves the desired tilt. However, because track 522 is arcuate, the bottom of track 522 does not extend as far forward as would be the case, for example, if the track of FIGS. 13 and 14 were slanted to achieve the tilted orientation of the emblem.

Figure 17:
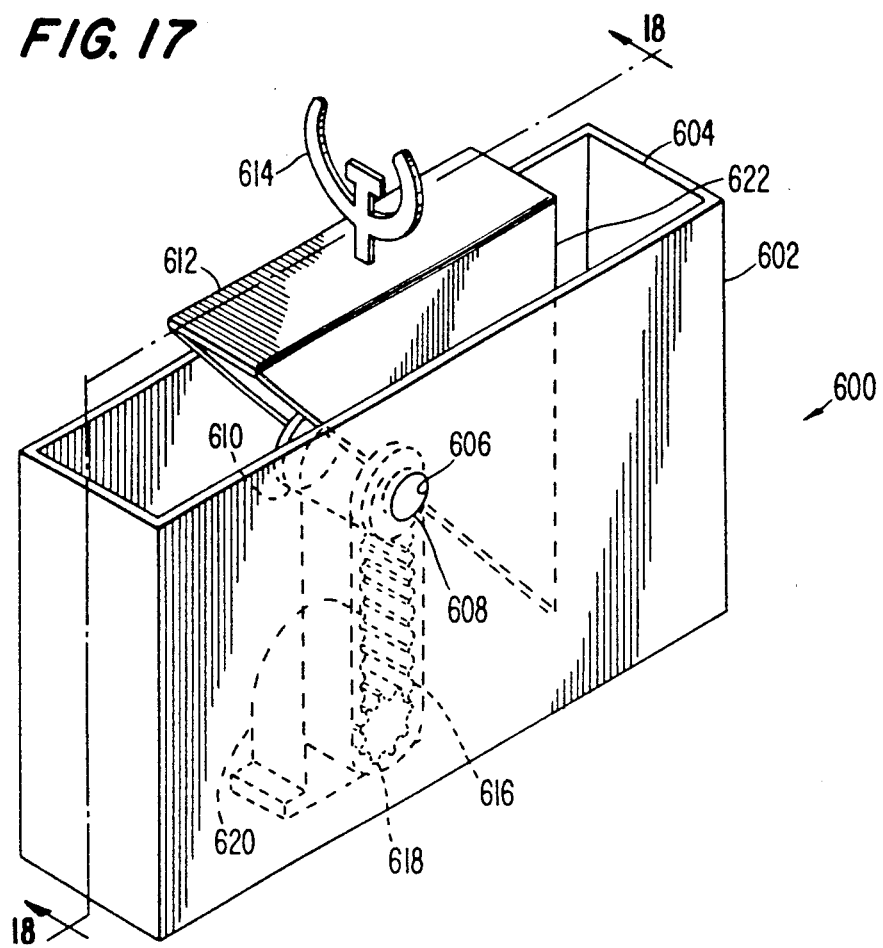
FIG. 17 is a perspective view of a sixth embodiment of the invention, partially shown in phantom.
Figure 18:
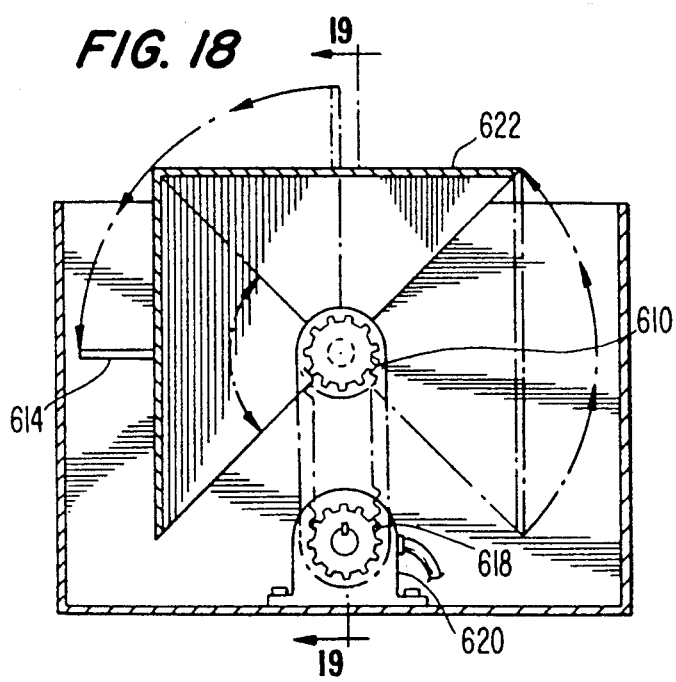
FIG. 18 is a sectional view taken along line 18—18 of FIG. 17.
Figure 19:
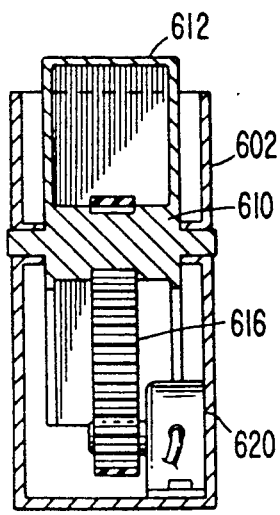
FIG. 19 is a sectional view taken along line 18—18 of FIG. 18.

FIGS. 17 through 19 illustrate a hood ornament retraction device 600 particularly adapted for retraction of hood ornaments elongated along an axis parallel to the length of the vehicle. The device includes a housing 602 of generally rectangular shape with one open end 604. The housing defines openings 606 which receive projecting ends 608 of a sprocket 610. The open end 604. The housing defines openings 606 which receive projecting ends 608 of a sprocket 610. The sprocket fixedly carries a triangularly shaped emblem base 612, and emblem 614 is rigidly positioned on one surface of the base.

Sprocket 610 is connected by means of timing belt 616 to second sprocket 618 and motor 620. In order to move emblem 614 from an exposed to a retracted position, motor 620 causes sprockets 610 to rotate 90 degrees in either a clockwise or counterclockwise direction. As seen in FIG. 18, a clockwise movement of sprocket 610, and, consequently, emblem base 612, causes the display of emblem 614, and a counterclockwise movement causes the emblem to be retracted. In the retracted position, surface 622 of emblem base 612 is positioned substantially flush with the vehicle's hood (not shown).

The motor of the embodiment of FIGS. 17 to 19 is suitably deenergized by the timed switches or limit switches discussed above. In a preferred embodiment, the device of FIGS. 17 to 19 is provided with two limit switches that signal the relay control unit to stop the motor when emblem base 612 has moved through an intended 90-degree rotation.

Having thus described preferred embodiments of the present invention, it will be readily apparent to those skilled in the art that further modifications to the present invention may be made without departing from the spirit and scope of the invention as presently claimed. By way of example, actuating signals to relay control unit 116 may be generated when the key switch is moved between an off position and an on or ignition position, and such signals may be generated by an intermediary such as the vehicle's pneumatic system or the like. The actuating signals may also be generated by a sensor that senses a turning of the vehicle's steering wheel, a sitting in a seat of the vehicle, or the like.

We claim:

1. A device for retracting a motor vehicle hood ornament comprising:

a carrier for conveying said ornament between a first position in which said ornament is retracted below the hood of a motor vehicle and a second position in which said ornament is displayed atop said hood;

a drive means for driving said carrier;

control means for causing said drive means to drive said carrier to propel said ornament to said first position upon receipt of a first signal and to drive said carrier to propel said ornament to said second position upon receipt of a second signal;

an opening through which said ornament passes when moving between said first and second positions;

a door; and means for moving said door to close said opening as said ornament approaches said first position and for moving said door away from said opening as said ornament approaches said second position.

2. The device of claim 1, wherein said carrier comprises a rack and pinion, said rack being connected to said ornament and said pinion being driven by said drive means.

3. The device of claim 1, further comprising a base connected to said ornament, a plate defining said opening through which said ornament passes in moving from said first position to said second position, and a door arm supporting said door and having uppermost and lowermost angled projections, wherein said door is adapted to close said opening when said base moves against a topside of said lowermost angled projection as said emblem approaches said first position, and is adapted to move away from said opening when said base moves against an underside of said uppermost angled projection as said emblem approaches said second position.

4. The device of claim 3, wherein said door arm comprises an uppermost portion, a lowermost portion, a first hinge at the bottom of said lowermost portion adapted to allow said door to pivot toward and away from said opening, and a second hinge connecting said uppermost and lowermost portions, wherein said uppermost and lowermost portions define an angle between them, and said second hinge allows a degree of variation of said angle, such that said door is adapted to move into and out of said opening.

5. The device of claim 4, wherein said second hinge comprises a pin, a notch in one of said portions and a projection on another of said portions, said pin being received in cylindrical openings defined by said notch and projection, wherein said projection substantially fits snugly within said notch, but wherein faces of at least one of said portions which abut faces of the other of said portions are angled away from said faces of said other of said portions to allow said variation in said angle between said uppermost and said lowermost portions.

6. The device of claim 3, further comprising a locking arm, said locking arm being hinged at its bottom so as to be pivotable toward and away from said opening.

7. The device of claim 6, wherein said locking arm has an uppermost trigger, a lowermost trigger and a top surface that is angled downwardly in a direction of the center of said opening, and wherein, after said base moves against said lowermost projection of said door arm to thus move said door adjacent to said opening, said base moves against said lowermost trigger to cause said top surface to move toward and under said door, whereby said angle of said top surface urges said door into said opening, and wherein, before said base moves against said uppermost projection of said door arm, said base moves against said uppermost trigger of said locking arm to cause said top surface to move away from said door.

8. The device of claim 1, wherein said control means comprises a first stop means for generating a signal to stop said drive means when said ornament has achieved said first position and a second stop means for generating a signal to stop said drive means when said ornament has achieved said second position.

9. A device for retracting a motor vehicle hood ornament comprising;
a carrier for conveying said ornament between a first position in which said ornament is retracted below the hood of a motor vehicle and a second position in which said ornament is displayed atop said hood;
a drive means for driving said carrier; and
control means for causing said drive means to drive said carrier to propel said ornament to said first position upon receipt of a first signal and to drive said carrier to propel said ornament to said second position upon receipt of a second signal,
wherein said control means comprises a means for generating said first signal when an ignition switch of said vehicle is moved from an accessory position to an off position and for generating said second signal when said ignition switch is moved from said off position to said accessory position.

10. A device for retracting a motor vehicle hood ornament comprising:
a carrier for conveying said ornament between a first position in which said ornament is retracted below the hood of a motor vehicle and a second position in which said ornament is displayed atop said hood;
a drive means for driving said carrier; and
control means for causing said drive means to drive said carrier to propel said ornament to said first position upon receipt of a first signal and to drive said carrier to propel said ornament to said second position upon receipt of a second signal,
wherein said control means comprises a means for generating said first signal when a component of said vehicle having a locked condition and an unlocked condition is put into the locked condition and for generating said second signal when said component is put into the unlocked condition.

11. The device of claim 10, wherein said component is a door.

12. The device of claim 10, wherein said component is a hood.

13. The device of claim 10, wherein said component is a trunk.

* * * * *